J. KELLY.
SWITCH OPERATING DEVICE FOR RAILWAY CARS.
No. 11,269. Reissued Sept. 13, 1892.
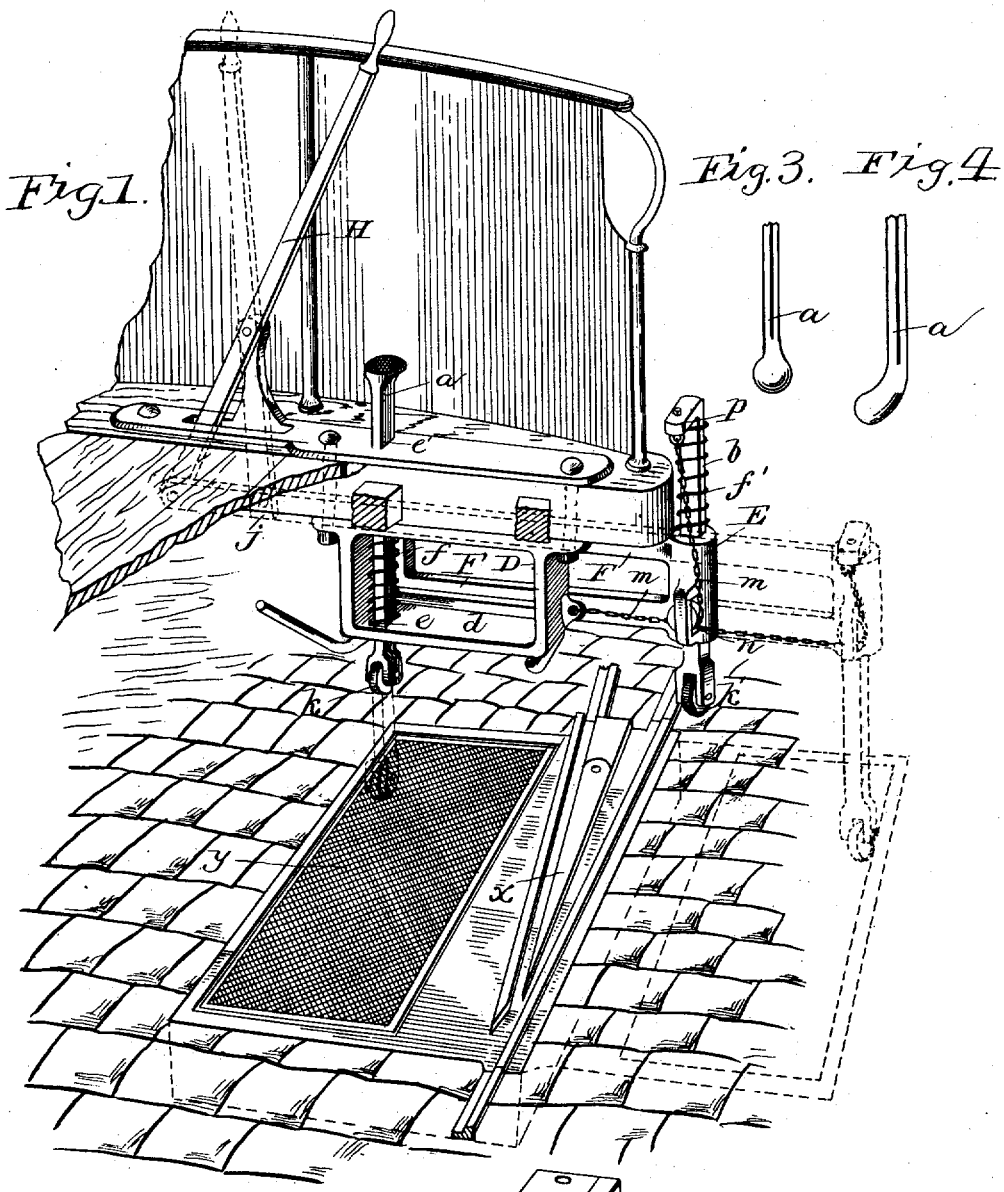
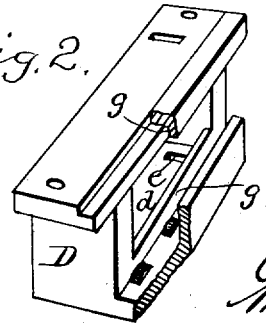
Witnesses:
C. G. Parker
A. D. Harrison
Inventor.
Joseph Kelly.
by
Wright Brown & Crossley.
Solicitors
THE NORRIS PETERS CO., PHOTO-LITHO., WASHINGTON, D. C.

UNITED STATES PATENT OFFICE.

JOSEPH KELLY, OF PITTSFIELD, MASSACHUSETTS.

SWITCH-OPERATING DEVICE FOR RAILWAY-CARS.

SPECIFICATION forming part of Reissued Letters Patent No. 11,269, dated September 13, 1892.

Original No. 427,577, dated May 13, 1890. Application for reissue filed July 8, 1890. Serial No. 358,097.

*To all whom it may concern:*

Be it known that I, JOSEPH KELLY, a citizen of the United States, residing at Pittsfield, in the county of Berkshire and State of Massachusetts, have invented new and useful Improvements in Switch-Operating Devices for Railway-Cars, of which the following is a specification.

This invention relates to devices to be applied on railway-cars—particularly street-railway cars—which may be operated at a suitable time in the passage of the car across a switch to move the switch, the object of the invention being the provision of mechanism for the purpose stated which is simple and durable, and which is capable of operating in connection with switches of various constructions, and which may be variously disposed in their positions relatively to a line transversely of the track; and the invention consists in the construction and combination of parts, all substantially as will hereinafter more fully appear, and be set forth in the claims.

Reference is to be had to the accompanying drawings, forming part of this specification, in which an embodiment of this invention is illustrated, similar letters of reference indicating corresponding parts throughout the drawings.

Figure 1 is a perspective view illustrating a forward and lateral portion of the platform of a street-railway car with parts thereof broken away to more clearly show the switch-operating mechanism which is applied on said platform, said view also indicating a portion of one side line of the track comprising a switch, and all showing the adaptability of the mechanism on the car for operating the switch. Fig. 2 is a perspective view of a detail part hereinafter referred to. Figs. 3 and 4 are detail views to be hereinafter referred to.

As well known, switches are variously located and adapted for their operation, sometimes by moving the tapered rail or switching-point in the frog by hand or through means of a properly-handled implement, and sometimes by the tilting of platforms placed in or along the railway which are capable of tilting movements when borne upon near either the one edge or the other, said tilting platforms having, through suitable means, connections with the switching-point, and said tilting platforms are often located at both sides of the rail-line; and I therefore, in order that I may by means of my present improved device operate upon a tilting switching-platform which may be either at the right or left of the line of the rail, provide a support D for a plunger *a*, which is vertically movable in said support in a line inside of the rail and corresponding with the position of a tilting switching-platform which is inside of the rail, and also another or supplemental support E, having therein a vertically-movable plunger *b*, said supplemental support being laterally movable on the main or primary support D, all whereby the guide-support E may be normally disposed closely to the platform or other suitable part of the car, and yet on desiring to operate an outlying switching-platform said guiding support may be laterally projected, whereby the plunger *b* therein on being given a downward thrust may have an impact properly against and in relation to said outlying platform for insuring the changing of the switch. The said main support D consists of a hanger-yoke, which is bolted under the front cross-sill of the platform about over the line of the rail, the exact position thereof being perhaps more or less out of coincidence with said rail-line, being laterally disposed either to one side or the other thereof in the equipment of the car with the present improved device, according as circumstances or the judgment of the constructor may render most expedient, and the lower horizontal uniting member *d* of said yoke has a vertical perforation *e* therein, forming one guiding-bearing for the plunger or spindle *a*, the other guiding-bearing for said spindle being comprised in a perforation *e'*, vertically formed through said cross-sill of the platform. A spring *f* is applied between a suitable shoulder of the plunger-spindle and the stationary yoke for normally maintaining said plunger-spindle in its uppermost position.

It will readily be seen that in approaching a switch comprising as an operative part thereof an inwardly-lying tilting platform *y*, and on desiring to operate said platform to change the switch, the same is effected by the car-attendant by merely depressing the plunger *a*, so that in its passage over said platform it will bear thereon to swing the platform, the downward pressure being imparted to the plunger on the upwardly-extended headed part, which is intended to usually stand at some little height above the platform-floor.

The supplemental support E, which forms the vertical guideway for the plunger *b*, is carried upon and by the outer end of a frame F or other species of sustaining-carrier, said frame moving laterally of the car, being supported and guided in the ways *g g* formed in said yoke, and as particularly seen in Fig. 2, friction-rollers *h h* are provided in the base of the lower guideway or groove *g*, the employment thereof being, however, not considered essential, although oftentimes desirable.

H represents a lever intermediately pivoted to swing in a vertical plane transversely of the car, and to the lower end of said lever is connected an inner part or extension *j* of said frame F, and of course on swinging the lever H properly therefor the frame F and support E will be projected outwardly, so that the latter may be in a position over an outlying automatic switching-platform, and of course to insure the then downward thrust of the plunger *b* through and below its support actuating devices therefor are to be provided, and a simple means for this purpose is comprised in the flexible connection (chain) *m*, which by one end is secured to a fixed part of the car—as to the ear-piece *l* on the yoke D—said chain thence passing horizontally under and around the sheave *n* on the side of the guide-support E and thence upwardly to a connection with the lug or angular extension *p* on the upper end of the plunger *b*. As through the swinging of the lever H the support E and plunger *b* are moved outwardly, the chain is drawn upon, as will be perfectly clear on an inspection of the drawings, hauling down the plunger *b* against its spring *f'*, to insure its projection for the impact against the outlying tilting switch-platform. On shifting the lever H to its usual position the support E, with its carrying-frame F, is moved inwardly toward or against a part of the platform structure.

It will be plain that the plunger *a*, in lieu of being constrained for a vertical movement in a line inside of the track, may be so disposed as to have its movement about or nearly in the line of the track, whereby when downwardly extended it may engage the tapered rail or switching-point *x* directly, to swing it for effecting the switching of the car, although the invention is mainly designed for action upon the automatic switches or those comprising tilting platforms *y*, and is intended especially for use for operating that class of switch upon electric and cable cars, its use on horse-cars obviously being of but slight advantage.

In Fig. 1 the lower extremities of the plunger-spindles *a* and *b* are shown as consisting of friction-rollers *k*, which may roll on the pavement and over the automatic switch-platforms, while at the same time exerting a downward force thereon, and in Fig. 3 the spindle extremity is shown as spherical or of knob form, the extremity of the spindle shown in Fig. 4 being of somewhat similar form, but shown as turned rearwardly to constitute a drag, and either of these or other-shaped ends may be employed, as in the judgment of the constructer or user is deemed most advantageous.

Having thus described my invention, what I claim, and desire to secure by Letters Patent, is—

1. The combination, with a suitable supporting part of a car-platform, of a supplemental support laterally movable on said primary support, a plunger vertically movable in relation to said supplemental support, and a spring for normally maintaining said plunger in its uppermost position, an appliance for causing the lateral movement of said supplemental support, a flexible connection by one end secured to a part of said plunger and thence guided to and attached to a stationary part of the car, all whereby when said supplemental support is outwardly moved said plunger will, through said flexible connection, be downwardly drawn, substantially as and for the purpose set forth.

2. The combination, with the platform of a car provided with a hanger-yoke having therein vertical perforations and the guideways *g g*, of the vertically-movable and spring-supported plunger-spindle *a*, and the frame F, movable in said guideways and provided with a part E, constituting a vertical guiding-bearing, a plunger-spindle spring-supported in said latter bearing, a means for moving said frame and bearing-support laterally, and a means for securing a downward thrust of the plunger therein guided, substantially as and for the purpose set forth.

3. As a means for operating a surface-railway switch, the combination, with a car, of a laterally-movable guide-bearing and a vertically-movable plunger therein, mechanism for giving lateral movement to said guide-bearing, and connections of the plunger therewith for automatically actuating the plunger by said lateral movement of the guide, the same being adapted to actuate a platform-switch, substantially as described.

4. As a means for operating a surface-railway switch, the combination, with two vertically-movable platforms connected with said switch and located one between the rails of the track and the other at one side of the track, of two vertically-movable plungers mounted on the car, one of said plungers being also laterally movable, and means for depressing either of said plungers, substantially as and for the purpose set forth.

In testimony whereof I have signed my name to this specification, in the presence of two subscribing witnesses, this 27th day of June, A. D. 1890.

JOSEPH KELLY.

Witnesses:
ARTHUR W. CROSSLEY,
A. D. HARRISON.